United States Patent Office 3,342,423
Patented Sept. 19, 1967

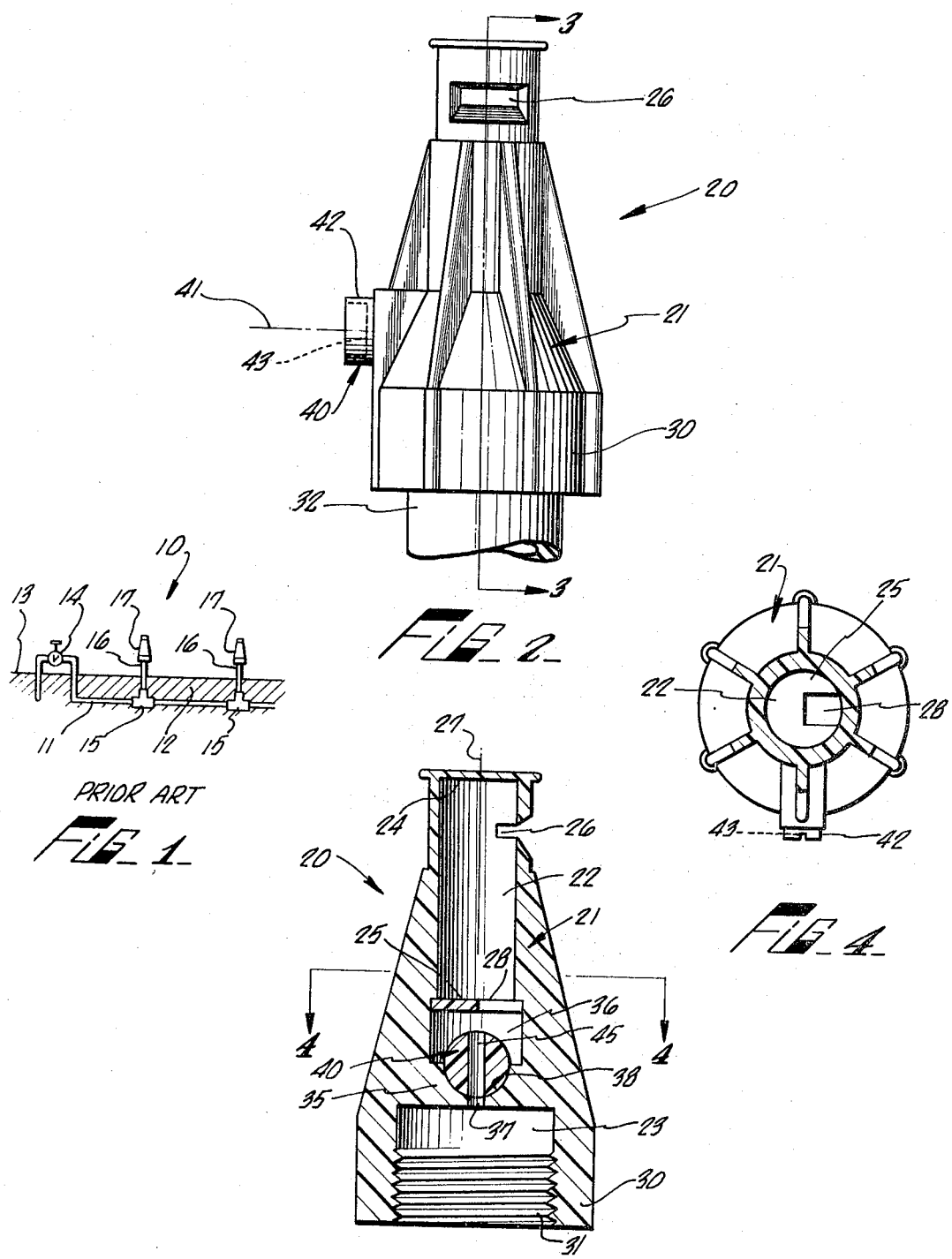

3,342,423
FLOW REGULATED LIQUID DISCHARGE DEVICE
John O. Hruby, Jr., and Wayne W. Frempter, Burbank, Calif., assignors to Rain Jet Corporation, Burbank, Calif., a corporation of California
Filed Feb. 1, 1965, Ser. No. 429,253
3 Claims. (Cl. 239—580)

This invention relates generally to the art of discharging liquids in a spray of discrete droplets and, more particularly, to a lawn sprinkling head having the feature that the flowrate of water through the head is adjustable at the head rather than at some location remote from the head.

Built-in lawn sprinkling systems, i.e., lawn sprinkling systems wherein a water pipe is buried in the ground and is connected to a plurality of water discharge heads disposed either flush with the lawn or above it, are known. The water pipe normally is valved at a location out of the area sprinkled when the system is turned on. Because the sprinkling or water discharge heads are spaced along the pipe, the pressure of the water supplied to the heads decreases, because of "head loss" in the pipe, proceeding away from the control valve. Accordingly, unless some compensation is made, the head closest to the valve will discharge a greater quantity of water at a greater pressure and rate, and thereby water a greater area of lawn, than the next adjacent head along the pipe away from the control valve, and so on. It is desirable, however, that each sprinkling head water substantially the same amount of lawn surface.

This invention provides an improved water dispensing device having particular utility as a lawn sprinkling head. The device includes a mechanism for regulating the flow of water through the head so that a given head discharges water at the same rate as other similar heads in a lawn sprinkling system of which the given head is a component. The flow regulating apparatus has the feature that it is operable from the lawn surface; no other elements of the head need be removed to provide access to the flow regulator.

Generally speaking, this invention provides an improved liquid discharging device such as a lawn sprinkling head. The device includes a hollow body having spaced ends, the body defining therein a chamber having two ends and a fluid flow passage communicating one end of the chamber with one end of the body. The body is adapted at the one end thereof for connection to a liquid supply pipe. The chamber has an inlet opening to the chamber from the passage through one end of the chamber. The inlet opening communicates with the chamber eccentric of the longitudinal axis of the chamber. The body also has an outlet opening from the chamber which is larger in size than the inlet to the chamber and is spaced between the ends of the chamber. The inside surface of the chamber ends preferably are spaced from the outlet opening by at least one-fourth of the largest transverse dimension internally of the chamber. A valve member is disposed in the passage in spaced relation to the one end of the chamber for rotation about an axis transversely of the passage. The valve member has an operating end exposed to the exterior of the body laterally of the passage. The valve member is rotatable in the body for varying the fluid flow communication to the chamber through the passage.

The above-mentioned and other features of the present invention are more fully set forth in the following detailed description presented in conjunction with the accompanying drawing which illustrates a preferred embodiment of the invention. In the drawings:

FIG. 1 is a cross-sectional elevation view of a portion of a built-in lawn sprinkling system or the like;
FIG. 2 is an enlarged elevation view of an improved sprinkling head according to this invention;
FIG. 3 is a cross-sectional elevation view taken along line 3—3 of FIG. 2; and
FIG. 4 is a cross-sectional elevation view taken along line 4—4 of FIG. 3.

FIG. 1 shows a lawn sprinkling system 10 according to the prior art but in which devices according to the invention may be used. The system includes a water supply pipe 11 buried in ground 12 below the surface of a lawn 13. Water flow through pipe 11 is controlled by a valve 14 disposed in a portion of the pipe located above the ground. A plurality of T-fittings 15 are spaced along pipe 11. A riser pipe 16 extends from each T-fitting to above lawn 13, and a sprinkling head 17 is connected to the upper end of each riser above the surface of the lawn.

In prior art lawn sprinkling systems, the only control (apart from valve 14) over the flowrate of water through the heads in a system was by way of a flow regulator associated with each head and located in the riser below the lawn surface adjacent just above each T-fitting. Such flow regulators, however, can not be adjusted unless the sprinkling heads above them are removed or are at least partially dismantled. The head must be removed so that the shank of a long handle screwdriver can be engaged with the regulator to change its setting. Such a method of flow regulation installation requires that a time-consuming trial and error process be carried out to properly adjust the system. Each head has to be disassembled and then reassembled following each adjustment of the regulator associated with the head. Patents 2,810,607, 2,899,978 and 2,963,264, all issued to John O. Hruby, Jr., illustrate prior art flow regulators of the type referred to above.

FIGURES 2 and 3 show an improved lawn sprinkling head 20 exemplary of liquid discharging devices according to this invention. The head includes a hollow housing or body 21 which defines therein a chamber 22 and a fluid flow passage 23 aligned with the chamber. The chamber has upper and lower ends 24 and 25, respectively, and has a circular cross-sectional configuration. Adjacent the upper end of the chamber, the body defines a chamber outlet opening 26 which has a greater extent in a direction transversely, i.e., circumferentially, of the chamber than it does in a direction parallel to a longitudinal axis 27 of the chamber; the outlet opening can be oriented parallel to axis 27 or oblique to the axis if desired. The chamber also has an inlet opening 28 in end 25 placing the chamber and passage 23 in fluid flow communication with one another. The chamber inlet opening is displaced laterally of the chamber longitudinal axis and is smaller than the outlet opening. Preferably, the center of the inlet opening is aligned with the center of the outlet opening so that water is discharged from the outlet opening in a generally horizontal plane. The inside surfaces of chamber ends 24 and 25 are spaced from the outlet opening by at least one-fourth the largest internal diameter of the chamber when the medial plane of the outlet opening is normal to axis 27.

The body has a lower end 30 to which fluid flow passage 23 opens. An internal thread 31 is formed in the circumference of the passage at the lower end of the body so that the body is adapted for connection to an externally threaded water supply pipe 32. Water supply pipe 32 may be a riser pipe 16 when head 20 is installed in lawn sprinkling system 10 in place of a head 17.

Body 21 defines a septum or partition 35 across passage 23 at a location spaced from chamber lower end 25. The body is so configured that a cavity 36 is provided between the upper surface of the septum and the lower end of the chamber. An aperture 37 is formed through the septum concentric to the axis of the chamber. The upper end of aperture 37 opens to a circularly cylindrical recess 38 formed in the upper surface of the septum. A cylindrical valve member 40, having a diameter corresponding to the diameter of recess 38, is disposed in the recess. The valve member is mounted in the housing for rotation about an axis 41 disposed normal to chamber axis 27. The valve member has an operating end 42 disposed exteriorly of the body laterally of the passage. A slot recess 43 is formed in the operating end of the valve member and is adapted to receive the blade of the screwdriver or the like so that the valve member can be rotated relative to the body.

As shown in FIG. 3, a hole 45 is formed diametrically through the valve member in such a position along the valve member that the hole moves into and out of registry with septum aperture 37 as the valve member is moved angularly relative to the body. FIG. 3 shows the valve member disposed so that maximum registry is obtained between aperture 37 and hole 45, thereby permitting maximum fluid flow communication through passage 23 to chamber 22. When the valve member is rotated 90° from the position shown in FIG. 3, however, aperture 37 is closed by the exterior of the valve member and no fluid flow communication is provided across the septum.

Chamber 27 and the inlet and outlet openings for the chamber are configured and arranged in accord with Patent 3,082,961, issued on March 26, 1963, to John O. Hruby, Jr.; this patent has been assigned to the assignee of the present invention. It has been found that devices in accord with this patent show optimum performance characteristics when the water supplied to the chamber inlet opening flows substantially straight towards the opening. That is, it is preferable that the water supplied to the chamber inlet opening not swirl tangentially of the duct or pipe through which the water flows to the chamber. When the water swirls as it enters the chamber, the pattern of water discharge from the chamber is distorted. Accordingly, it is preferred that axis 41, about which valve member 40 rotates, be disposed perpendicular to the direction in which chamber inlet opening 28 is offset from chamber axis 27. When such a relationship is obtained, water flowing through the valve when the valve hole is partially registered with aperture 37 is directed toward chamber inlet opening 28 and the water entering the chamber does not show an undesired amount of swirl.

From the foregoing description, it will be seen that a sprinkling head according to this invention incorporates a fluid flow restrictor which is operable without requiring removal of other portions of the head. This means that a sprinkling system in which heads 20 are used can be adjusted very rapidly to compensate for between-head pressure drop in buried water pipes or the like.

Preferably the components of the head described above are fabricated from a hard plastic such as polyvinylchloride, acrylonitrile-butadiene-styrene (ABS resins), or acetal resins derived by polymerization of formaldehyde.

While the invention has been described above in conjunction with specific apparatus, this has been by way of example only and is not to be considered as limiting the scope of this invention.

What is claimed is:
1. A liquid discharging device comprising a hollow body having spaced ends and defining therein an elongated chamber having two ends and a fluid flow passage aligned with the chamber and communicating one end of the chamber with one end of the body, the body being adapted at the one end thereof for connection to a liquid supply pipe, the chamber at the one end having an inlet opening thereto from the passage within the chamber and eccentric of the longitudinal axis of the chamber, the body having an outlet opening from the chamber larger in size than the inlet to the chamber and spaced between the ends of the chamber, the extent of the outlet opening taken transversely of the chamber being greater than its extent taken in the direction of said longitudinal axis, the inside surface of said chamber ends being spaced from the outlet opening by at least one-fourth of the largest transverse diameter of the chamber, the body defining a singly apertured septum across the passage between the chamber inlet and the one end of the body, and a cylindrical valve member engaged with the side of the septum toward the chamber and mounted in the body for rotation about a disposed axis transversely of the passage and normal to the direction in which the chamber inlet is eccentric to said longitudinal axis, the valve member having an operating end exposed to the exterior of the body laterally of the passage, the valve member having a hole diametrically therethrough located along the valve member so that the hole is moved into and out of registry with the septum aperture as the valve member is rotated.

2. Apparatus according to claim 1 wherein the side of the septum toward the chamber defines a circularly cylindrical recess and the valve member has a diameter corresponding to the diameter of said recess and is disposed in said recess.

3. A liquid discharging nozzle for use in lawn and garden sprinkling systems and the like consisting of a hollow body having spaced ends and defining therein a chamber having a longitudinal axis, two ends and a fluid flow passage communicating one end of the chamber with one end of the body, the body being adapted at the one end thereof for connection to a liquid supply pipe, the chamber at the one end having an inlet opening thereto from the passage within the chamber and eccentric of the longitudinal axis of the chamber, the body having an outlet opening from the chamber larger in size than the inlet to the chamber and spaced between the ends of the chamber, and a substantially cylindrical valve member having a hole formed diametrically therethrough and an operating end exposed to the exterior of the body laterally of the passage, the valve member being disposed in the passage in spaced relation to the one end of the chamber for rotation about an axis oriented transversely of the passage and perpendicular to the direction of eccentricity of the chamber inlet opening relative to the longitudinal axis, the valve member being rotatable in the body for varying the fluid flow communication to the chamber through the passage.

References Cited
UNITED STATES PATENTS

| 717,042 | 12/1902 | Smith | 239—469 X |
| 1,142,410 | 6/1915 | Filbin | 239—569 |
| 2,591,282 | 4/1952 | Nelson | 239—465 X |
| 2,965,313 | 12/1960 | Jay | 239—569 |
| 3,082,961 | 3/1963 | Hruby | 239—598 |

M. HENSON WOOD, JR., *Primary Examiner.*

VAN C. WILKS, *Assistant Examiner.*